CALIBRATION OF MULTIPLE CHANNEL ELECTRONIC SYSTEMS

Filed Dec. 12, 1967 4 Sheets-Sheet 1

HILLEL WEINBAUM
INVENTOR

BY Arnold, Roylance, Kruger & Durkee
ATTORNEYS

Dec. 1, 1970 H. WEINBAUM 3,544,970

CALIBRATION OF MULTIPLE CHANNEL ELECTRONIC SYSTEMS

Filed Dec. 12, 1967 4 Sheets-Sheet 2

HILLEL WEINBAUM
INVENTOR

BY Arnold, Roylance, Kruger & Durkee
ATTORNEYS

Dec. 1, 1970 H. WEINBAUM 3,544,970

CALIBRATION OF MULTIPLE CHANNEL ELECTRONIC SYSTEMS

Filed Dec. 12, 1967 4 Sheets-Sheet 3

HILLEL WEINBAUM
INVENTOR

BY Arnold, Roylance, Kruger & Durkee
ATTORNEYS

HILLEL WEINBAUM
INVENTOR
BY Arnold, Roylance,
Kruger & Durkee
ATTORNEYS

United States Patent Office 3,544,970

Patented Dec. 1, 1970

3,544,970

CALIBRATION OF MULTIPLE CHANNEL ELECTRONIC SYSTEMS

Hillel Weinbaum, Houston, Tex., assignor to American Machine & Foundry Company, New York, N.Y., a corporation of New Jersey Filed Dec. 12, 1967, Ser. No. 689,973
Int. Cl. G06f *3/05;* H04j *3/14*
U.S. Cl. 340—172.5 5 Claims

ABSTRACT OF THE DISCLOSURE

This application discloses apparatus for calibrating or standardizing the gain in each channel of an electronic system having a large number of like channels. In each channel the gain is controlled by an attenuator arrangement including a series of digitally weighted resistors which may be switched into a voltage divider arrangement connected between amplifying stages. Switching devices for connecting the resistors in the desired configuration are controlled by memory units for each channel so that the desired gain may be individually entered in digital form and stored. The memory units are selectively addressed for entry of this information, while all of the channels except the addressed channel may be rendered inoperative so that the observed or detected system output is that of only one channel. The system may be automatically operated using an addressed register for sequentially addressing each channel and a sensitivity register which is incremented in response to the detected system output until the gain of the address channel reaches a desired level. Alternatively, the channels may be manually addressed and the sensitivity set into the memory units by a manual selector.

Electronic systems containing a large number of similar parallel channels are widely used in telemetry and communications, as well as in non-destructive testing of the type disclosed herein. The channels may be nominally the same from one to the other, continuing like transducers, amplifiers, and other components. Theoretically each channel should respond in the same way to a given input, producing an output signal which is the same for every channel for an equal input. This condition of course does not occur due to variations in manufacturing tolerances of the components, aging of the electronic elements, thermal gradients within the housing and similar well known factors. Thus, multi-channel systems usually contain gain control or attenuator devices in each channel, usually consisting of potentiometers, so that the gain of each channel may be adjusted to compensate for these variations so that the gain is the same for all channels. Of course, in some situations the desired gains for various channels are not equal but instead bear some fixed ratio to one another. In any event, the gains must be adjusted to the desired values, and when a large number of channels is present this can be a time-consuming, inaccurate and expensive procedure.

Ordinarily the gain of a multi-channel system is standardized or calibrated manually by an operator who activates one channel at a time and adjusts its gain, or adjusts the attenuator in this channel, while observing its output on an oscilloscope or voltmeter to obtain predetermined sensitivity to a reference signal applied to the input. The principal disadvantage to this technique is the amount of time needed to calibrate a system of many channels and the necessity for a skilled technician for operation. Also, the judgment factor of evaluating the output level and adjusting the attenuator for each channel will vary from operator to operator and among the various channels.

These problems of calibrating multiple channels are acute in non-destructive testing systems of the type used for pipe inspection. Such systems employ a large number of similar transducers which are scanning a pipe being inspected for flaws, the transducers usually being search coils responsive to flux leakage. For calibration, usually a section of pipe is provided which has a standardized or manufactured flaw so that a known input is provided for each of the transducers. The transducers rotate with respect to the pipe, and so a flaw signal is produced once for each revolution. An upper limit on the speed of revolution is imposed by mechanical considerations, and so the sampling rate for testing or for calibration is not very high, contributing to a rather long calibration time since many samplings are needed to check each channel. Also considerable time is used by the operator in observing the output and mechanically adjusting a potentiometer or the like. For manual calibration in a testing system of this type, perhaps an hour or more may be required by a skilled operator for calibrating a twenty or forty channel system. This time factor is quite unacceptable for mill operations because it is usually preferable to set up the testing system in series with the pipe manufacturing line, testing all of the pipe in rough form before the finishing operations. The mill may be in operation full time, producing pipe at a rate of a hundred feet per minute or more, and there would be no facility for storing the large quantity of pipe which would pile up if the testing apparatus was shut down for calibration.

It is therefore an important feature of the invention to provide a multi-channel electronic system wherein calibration may be accomplished in a rapid fashion with a minimum of manual operations, particularly for a multichannel non-destructive testing facility. Another feature is the provision of a multi-channel calibration system adapted for automatic operation without individual manual adjustments by an operator.

In accordance with a preferred embodiment of the invention a multiple channel system is provided wherein the gain of each channel is controlled by an attenuator arrangement including a series of resistors which are weighted according to a digital code. The resistors may be switched selectively to provide a voltage divider arrangement for controlling the attenuation or gain between amplifying stages. One of these attenuators is provided for each channel, along with associated switching devices for controlling the resistors. A set of memory units is associated with the switching devices for each channel so that the desired gain may be set into the memory units, and this level of gain will be stored or retained. The memory units for various channels are selectively addressed so that only one of the gain control or attenuator arrangements is altered at one time. At the same time, all of the channels except the one addressed are rendered inoperative, and the output of the system is observed or detected. Since only one channel is operative, the system output will be that of the addressed channel. In response to the observed or detected output, the gain for this channel is entered into the memory units, stored, and then the same procedure is followed for each of the other channels in succession.

Novel features which are believed characteristic of this invention are set forth in the appended claims. The invention itself, however, as well as other features and advantages thereof, may best be understood by reference to the following detailed description of particular embodiments, when read in conjunction with the accompanying drawings wherein:

Figures 1, 1A:
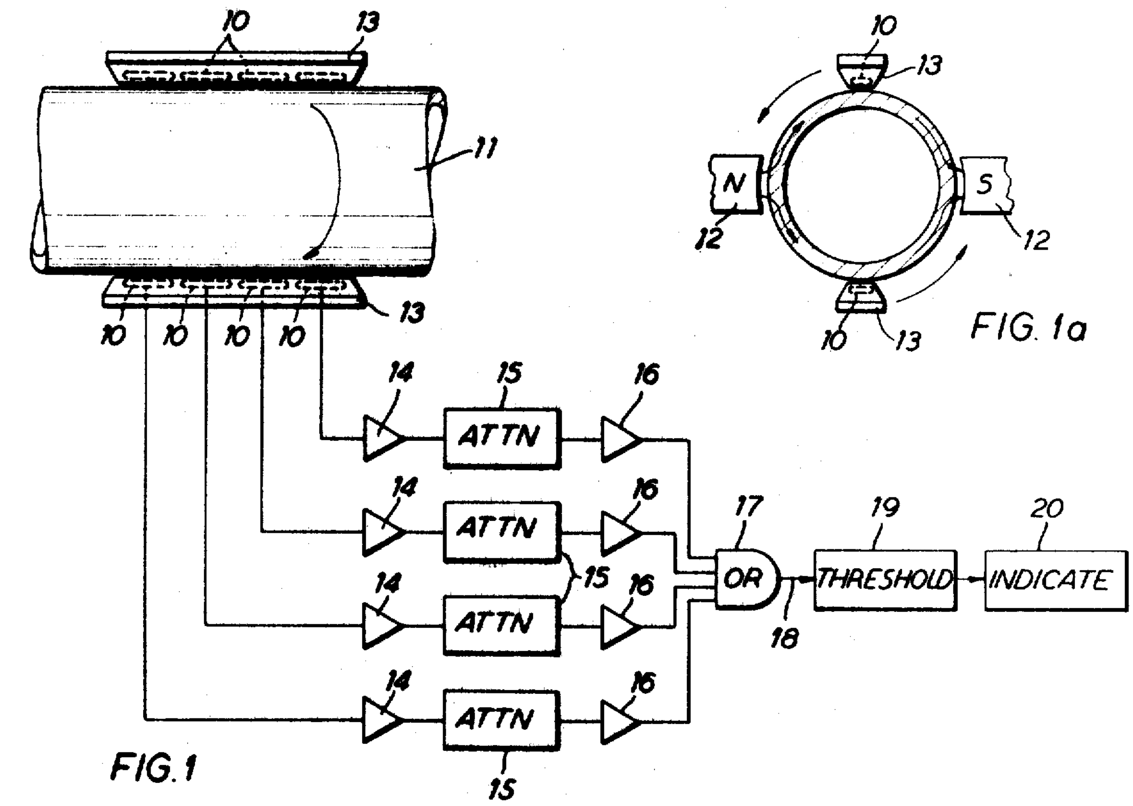
FIGS. 1 and 1A are a schematic representation of a nondestructive test system for pipe inspection in which the atuomatic calibration system of the invention may be utilized.

The drawings as above listed and as referred to in detail below are a part of this specification and are incorporated herein. It may be noted that like parts when appearing in various figures of the drawings will bear like reference numerals. The various embodiments of the invention as they appear in the drawings will now be described in detail.

With reference now to FIG. 1 of the drawings, a nondestructive testing system is illustrated which may utilize the calibration or standardization technique of this invention. It is of course understood that the arrangement of this invention could be utilized advantageously in many other types of testing systems, or in other environments, but this particular system will be described in some detail for the purposes of illustrating the principles and advantages of the invention. The testing system of FIG. 1 includes a large number of transducers 10 which may be in the form of sensing coils or search coils responsive to magnetic flux leakage. These transducers 10 are arranged to scan an object under test which may be a section of pipe 11. A magnetizer including pole pieces 12 provides magnetic flux in the walls of the pipe, defects in the pipe walls being detected due to deflection of the flux out of the pipe wall so that the flux intercepts the transducers or search coils 10. The pipe itself, or the arrangement including the magnetizers and transducers, would be rotated while the pipe would be moved axially to scan the entire object. Usually the transducers 10 would be arranged in a linear fashion along detector shoe assemblies 13 and would serve to protect the search coils from abrasion while assuring that the search coils will scan closely adjacent the pipe wall. This non-destructive testing technique has been found to be quite effective in the inspection of pipe of the type used for well casings and for transmission of natural gas and petroleum products.

A large number of the transducers 10 ordinarily would be utilized in a testing system of the type shown in FIG. 1, the transducers being arranged linearly along the detector shoes 13. Although eight transducers 10 are shown, more commonly there would be perhaps twenty or forty of these search coils. Each of the transducers 10 is connected separately through a preamplifier 14, a separate variable attenuator 15 which will be described in detail, and a further amplifier 16 to an OR gate 17. Although only four channels are shown as inputs to the OR gate, it is understood that a separate channel would be provided for each transducer, so similar channels would be provided for the remainder of the eight, twenty or forty transducers. The OR gate 17 functions to provide a signal at its output 18 whenever any one of the transducers 10 detects a flaw, but if two or more channels or transducers produce inputs to the OR gate an output will be produced only for the largest flaw indication. Either positive or negative signals are passed through the OR gate 17. The OR gate 17 is thus of the bipolar type and provides a "full wave OR" function, this being a standard electronic circuit for which further details need not be given.

Flaw signals produced at the output 18 of the OR gate 17 are applied to a threshold detector 19 which is set at a selected voltage level to determine the minimum size of the flaw signal to which the system will be responsive. This threshold level is variable under control of the operator, and would usually be selected at some level above the noise level, particularly at a level corresponding to a flaw which should cause rejection of the pipe. The threshold device 19 may be any one of a number of standard electronic circuits, such as a comparator circuit. The output of the threshold device is applied to an indicator 20, which may be a red light, a bell or the like. Usually the system of FIG. 1 would be used to provide a "Good" or "Bad" indication in the mill before the pipe is finished. Thus the sections or "joints" of pipe are run through the inspection apparatus, and if the red light or bell comes on the section or joint of pipe is rejected. Thus the threshold device 19 is set at a level to determine which pipe is to be accepted or rejected, no judgment factor being left to the field operating personnel.

It is understood that in place of the "go no-go" indicator arrangement of the system thus far described, the output of the OR gate 17 or the output of the threshold device 19 could be merely recorded on magnetic tape or on a strip chart for subsequent evaluation. Of course this would not be useful for mill operation. Recording may be done in addition to, rather than in place of, the alarm indication 20. In either event, it is important that the flaw indication signals produced by any one of the channels be the same as that produced by the other channels for a flaw of the same size.

Each of the channels including a transducer 10, amplifiers 14 and 16 and associated connections is nominally the same as each of the other channels; however, there will be variations in the sensitivity of the search coils. The gain of the amplifiers will be different even though exactly the same components are used, and these factors will vary with aging and temperature of all of the components involved. Accordingly, a given sized flaw tracking under the transducers may produce a signal at the output 18 of the OR gate of ten volts for one transducer but only six volts for another transducer. If the threshold is set at eight volts, then the same flaw would turn on the light if it passed under one transducer, but not if it passed under the other. To standardize all of the channels, it has previously been necessary in the system of FIG. 1 to manually adjust all of the attenuators 15 while a pipe 11 with a known flaw is in the inspection unit. For this purpose each of the attenuators 15 would be a potentiometer wherein the position of the movable tap would determine how much of the output of the amplifier 14 in each channel is applied to the input of the amplifier 16. One by one, the attenuators or potentiometers would be adjusted to produce equal inputs to the threshold device 19. All channels except one would have to be opened, so that the channel being calibrated would produce an output 18 which would be observed on an oscilloscope or meter. The potentiometer 15 would be adjusted until the indication was at the desired level; then the connection to this channel would be opened and another channel observed. This procedure is of course quite time-consuming and may introduce errors due to the judgment of the operator in observing the output, unless output devices such as digital voltmeters are utilized. The time required for a technician to calibrate a forty channel testing system is a rather expensive item itself, while the delays in the mill during calibration introduce perhaps unacceptable cost factors.

In accordance with the present invention, immediately before the pipe mill is set into operation, and possibly after every three to four hours of continuous operation, for example, the mill is stopped and a sample piece of pipe having a known standard defect therein is placed within the shoe 13 of FIG. 1. The sample pipe is rotated so that detector coils 10 produce defect signals on each of the plurality of signal channels. The automatic calibration system of this invention then is set into operation and in a very short period of time all signal channels automatically are calibrated to produce equal output signals in response to the standard or reference defect in the pipe. The calibration operation is accomplished without requiring the operator to do anything except initiate it, thus eliminating human judgment and reducing considerably the time required to calibrate all channels. The standard piece of pipe then is removed and the mill is again set into operation.

Figure 2:
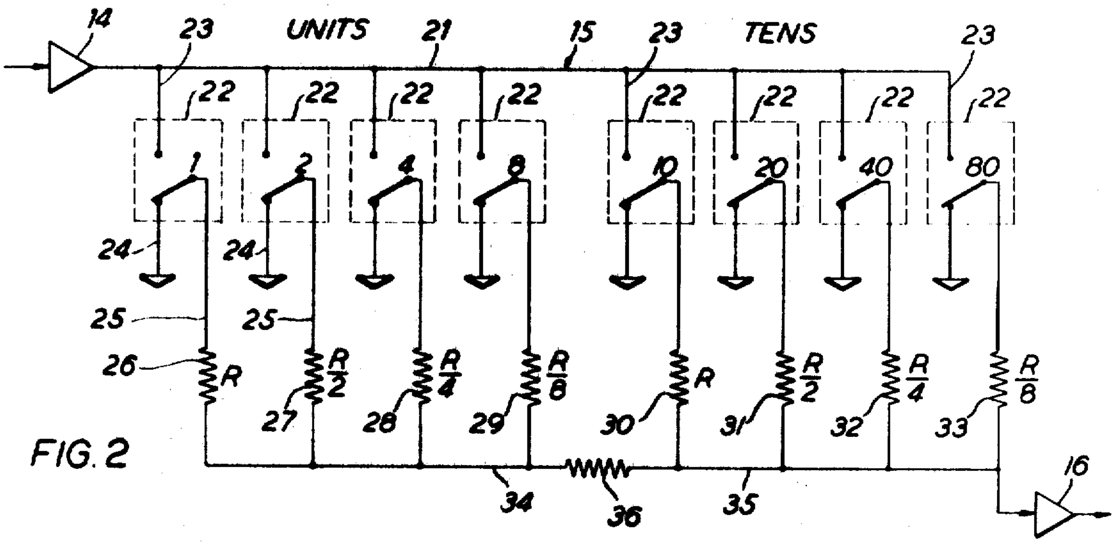
FIG. 2 is an electrical schematic diagram of an attenuator arrangement for use in the system of FIG. 1 according to the invention.

An automated multi-channel calibration system according to the invention may utilize a digital type attenuator arrangement 15 as illustrated in FIG. 2. Each channel would include one of these attenuator arrangements connected between the output of the preamplifier 14 and the input of the amplifier 16. The attenuator circuit 15 includes an input line 21 connected to the output of the amplifier 14 and a plurality of switching devices 22 having one input connected to the common line 21 by parallel lines 23. One contact or output of each of the switches 22 is connected to a ground or reference potential, which may be negative, by a line 24. The other output of each of the switches is connected by a line 25 through one of a set of resistors 26–29 or a set or resistors 30–33 to output lines 34 or 35. The values of the resistors 26–29 are weighted according to the ratios R, $R/2$, $R/4$ and $R/8$, respectively, as indicated on the drawing. Similarly, the resistors 30–33 are weighted according to the same ratios. The set of resistors 26–29 along with their associated switches 22 is designated the "units" set, while the resistors 30–33 and switches are the "tens" set. The resistors 26 and 30 are of the same value R, and so a weighting resistor 36 is connected between the output line 34 and the output line 35 to reduce the influence of the units set, the value of this resistor 36 being 4.3K ohm if the resistors 26 and 30 are 8K ohm. The output 35 is connected to the input of the amplifier 16.

In the operation of the attenuator of FIG. 2, the portion of the output of the amplifier 14 applied to the input of the amplifier 16 is dependent upon the positions of the switches 22. With all of the switches in lower position, all of the resistors 26–33 will be connected to ground or the negative reference potential so that the attenuation is one hundred percent or transference is zero, whereas if all of the switches were in the upper position the attenuation would be zero or transference is one hundred percent, all variations in-between permitted increments of one percent. However, since this system is operated on a binary-coded-decimal arrangement, with the resistors 26–29 corresponding to one, two, four and eight units of transference and the resistors 30–33 corresponding to ten, twenty, forty and eighty units of percentage transference, respectively, it may be noted that all eight of these switches 22 would not be closed at any one time. The maximum transference of ninety-nine percent corresponds to the switches associated with the resistors 26, 29, 30 and 33 being closed or in the upper position. For this reason an additional gain of 1.6 is provided in the amplifier stages to account for the fact that the system is operated on a decimal or ten basis rather than strictly binary which provides sixteen units in the four bit arrangement.

In the attenuator of FIG. 2, for example, if the desired transference is fifty-six percent the switches 22 associated with the resistors 30 and 32 would be in the upper position to produce forty plus ten, and the switches associated with the resistors 27 and 28 would be in the upper position to provide four plus two, totaling nominally fifty-six. Considering 1.6 to be one hundred percent, and calculating the effect of the resistors in the voltage divider arrangement, it would be seen that fifty-six percent transference would be provided.

The values of the resistors used in the attenuator of FIG. 2 are such that the effect of the attenuator on the output of the amplifier 14 or on the input of the amplifier 16 will be negligible. Ordinarily the amplifier 14 is a low output impedance device, while the input of the amplifier 16 is of very high impedance. For example, the output impedance of the amplifier 14 may be perhaps a small fraction of one ohm, while the input impedance of the amplifier 16 may far exceed 100K ohm. In this case, if the resistors 26 and 30 are each 8K ohm and the others correspondingly less by the indicated ratios, the impedance of the voltage divider arrangement will always be in the nature of a few hundred ohms in series or shunted to ground. Thus, variations in this impedance as caused by switching of the transference will have little influence since it will always be perhaps two orders magnitude larger than the output impedance of the amplifier 14, or two orders of magnitude less than the input impedance of the amplifier 16. It is important that the impedance of the attenuator 15 be much greater than the output impedance of the preceding amplifier and much less than the input impedance of the subsequent amplifier, regardless of the switch positions.

Figure 3:
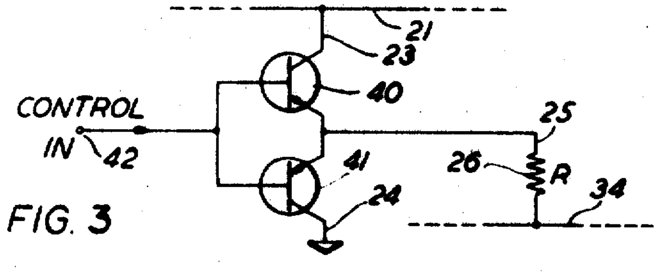
FIG. 3 is an electrical schematic diagram of a switch unit for use in the system of FIG. 2.

Referring to FIG. 3, a preferred arrangement for one of the switches 22 is illustrated. Each of the switches 22 consists of a pair of complementary transistors including an NPN transistor 40 and a PNP transistor 41. The emitters of the two transistors are connected together and in the output line 25 going through the resistor 26 to the output line 34. The bases are connected together and to an input line 42 to which is applied either a negative or positive voltage, as will be explained. The collector of the transistor 40 is connected by the line 23 to the input bus 21, while the collector of the PNP transistor is connected by the line 24 to the negative reference potential or ground. With this arrangement, when the input line 42 is negative the transistor 40 will be cut off and the transistor 41 turned on, in effect grounding the line 25 through the emitter and collector electrodes of the transistor. This corresponds to the situation where the switch is in the lower position as seen in FIG. 2. When the input 42 is at a positive voltage the transistor 41 will be cut off, the transistor 40 will be turned on since its base is positive with respect to its emitter, and the line 25 will be connected to the input line 21 through the collector-emitter electrodes of the transistor 40, which will exhibit very little or essentially zero impedance. One of the complementary pairs connected as seen in FIG. 3 is used for each of the switches 22 in the circuit of FIG. 2, and these switches may be addressed individually by separate input lines 42.

Figure 4:
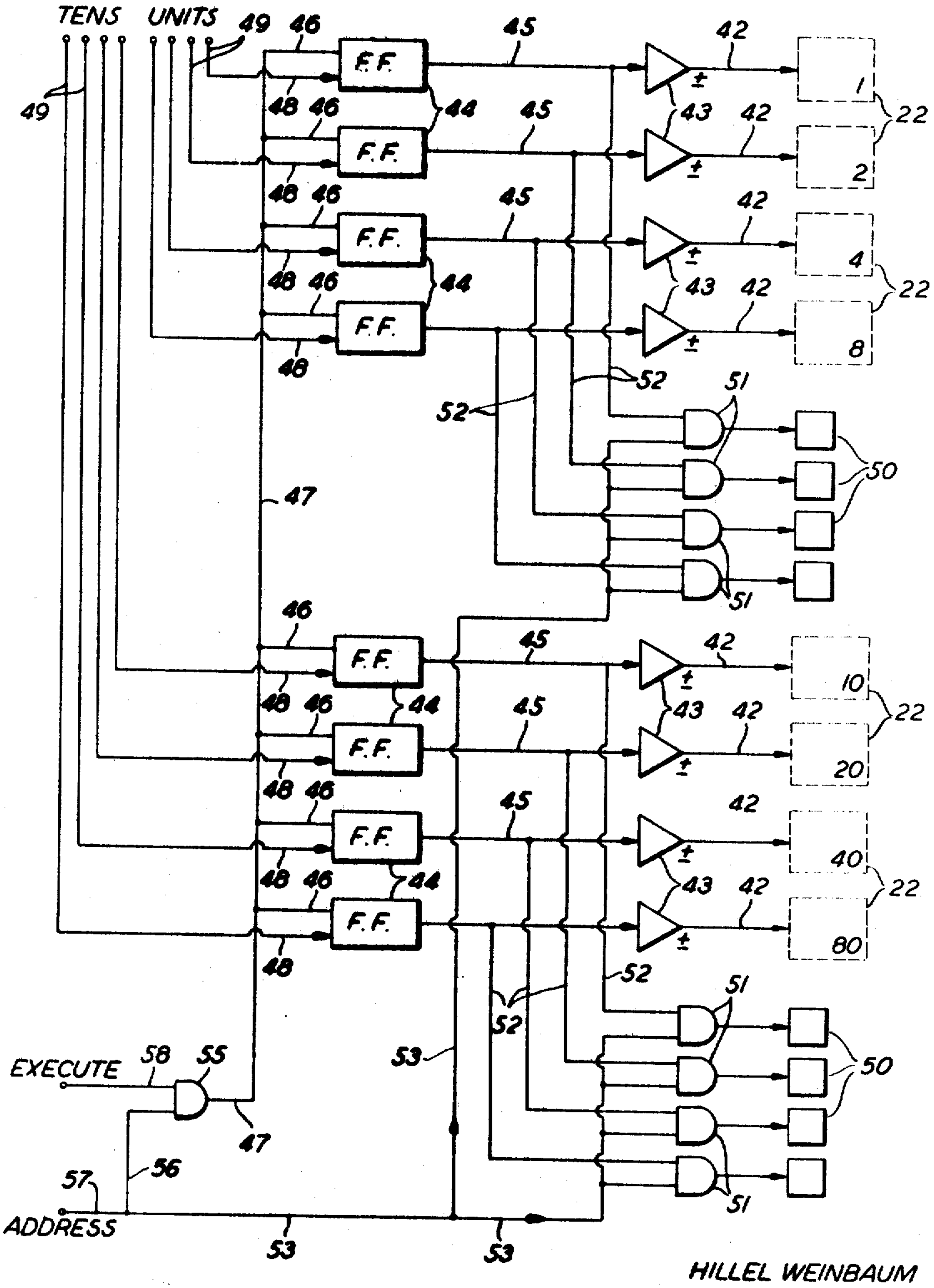
FIG. 4 is an electrical schematic diagram in block form of a memory unit for controlling the switches in one of the attenuator units of FIG. 2 according to the invention.

The arrangement used for selectively operating the switches 22 in the attenuator of FIG. 2 for each channel, is illustrated in FIG. 4. Each of the switches 22 for the units and tens group has either a negative or positive voltage applied to its input 42 from one of a set of eight amplifiers 43 which are driven individually from two groups of four flip-flops 44. The amplifiers 43 are merely two-stage transistor amplifiers having an output stage connected between positive and negative reference potentials, so that either a positive or a negative voltage is produced for driving the switches of the type shown in FIG. 3. The flip-flop or bistable circuits 44 are of conventional form and produce a negative voltage on an output 45 going to the amplifier 43 when in the zero state, or a positive voltage on the line 45 when in the one state. The flip-flop circuits 44 are enabled to switch states only when an execute voltage is applied to an input 46 to each flip-flop. For a given channel, all of the inputs 46 are driven in common by an execute bus 47 which is energized as will be described. The flip-flops 44 are set in a given state by a command voltage applied to inputs 48 from sensitivity selection input lines 49. The input lines 49 may be driven from a sensitivity selection register or manually from a binary-coded-decimal switch. When a zero appears on one of the lines 49, a corresponding flip-flop will be set to the zero position; likewise a one voltage appearing on a line 49 will cause the flip-flop to be set to the one condition, assuming of course the execute bus 47 is energized. The flip-flops 44 serve as a memory as they remain in the condition in which they are set until again addressed and reset. The conditions of the memory flip-flop 44 may be monitored by indicator devices 50 which are connected through AND gates 51 by means of lines 52 to each of the output lines 45 from the flip-flops 44. The voltages appearing on the lines 45 will be applied to the indicators 50 through the AND gate 51 only when the second inputs of the AND gates are energized from address bus lines 53. It should be noted that the indicators 50 are common to all of the channels, rather than separate indicators 50 being provided for each channel. The indicators 50 may be merely lamps driven by suitable amplifiers, or a binary-coded-decimal-to-decimal converter may be used.

In FIG. 4, the execute line 47 is energized in any given channel only when both inputs to an AND gate 55 are energized. One input 56 to the gate 55 is from an address line 57, this line also being connected to the visual readout actuator line 53. A voltage is applied to the address line 57 for a given channel only when the sensitivity of this channel is to be adjusted. When the line 57 is energized, immediately the present status of the flip-flops 44 will be read out on the indicators 50 since all of the AND gates 51 will be enabled. However, the states of the flip-flops 44 cannot be changed until another input 58 to the gate 55 is energized. In this manner, the information stored in the memory or the flip-flops 44 is maintained stable, safely guarding this information unless both the address line 57 and execute line 58 for a given channel are energized. It may be noted that all of the circuitry of FIG. 4 would be duplicated for each channel, and the execute line 58 would be common to all twenty or forty channels. The address lines 57 would be individually associated with a particular channel, however.

The memory arrangement of FIG. 4 includes two groups of four flip-flops 44, one group for units and the other for tens. This provides a system having one percent precision, i.e., the gain may be set at any level from zero to ninety-nine in increments of one. It is readily seen that if increments of tenths of a percent or hundredths of a percent are desired, then one or two more groups of flip-flops and associated attenuators and switching units may be utilized. That is, four-place precision on a decimal scale could be provided instead of two-place as illustrated.

Figure 5:
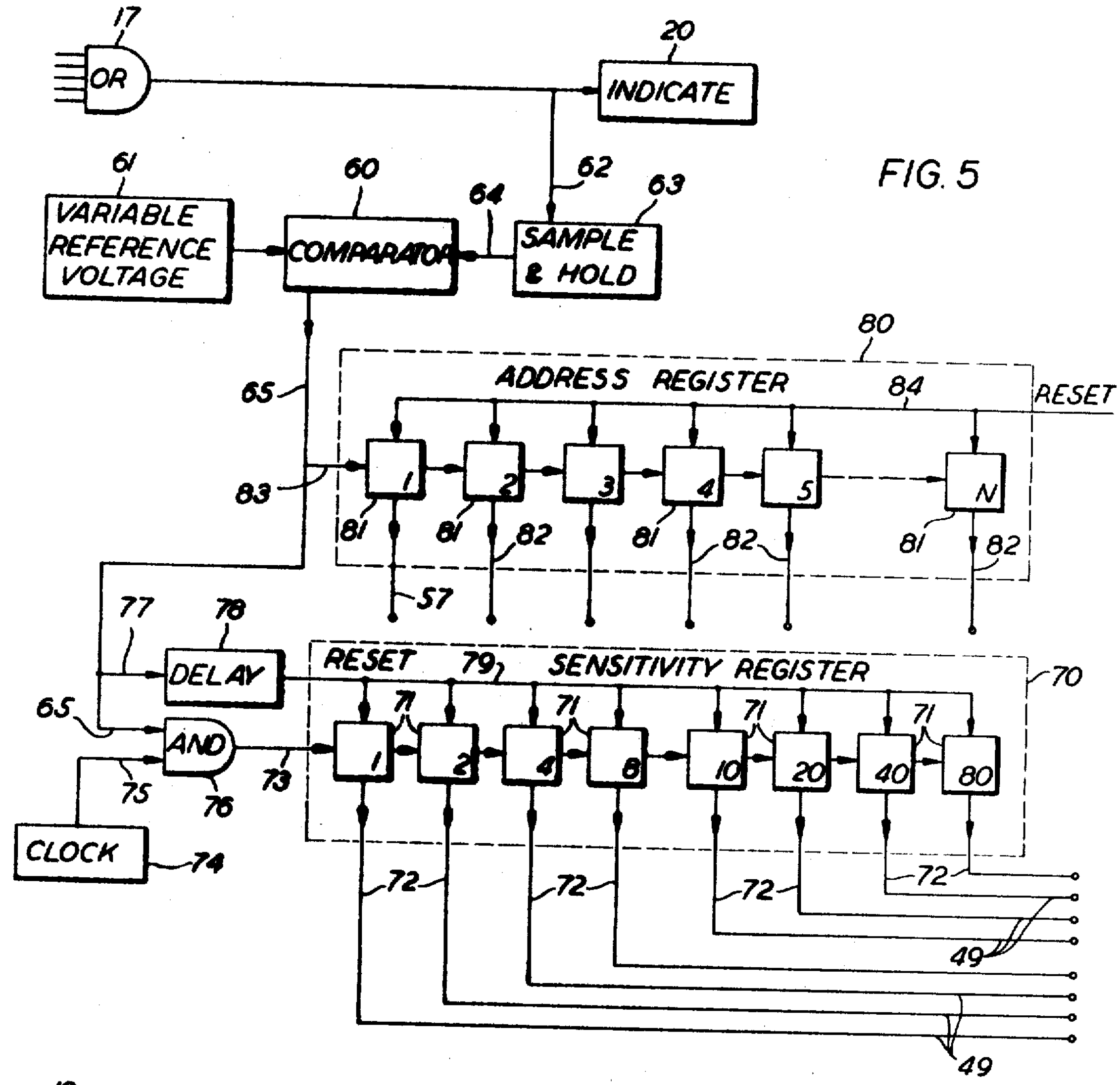
FIG. 5 is an electrical schematic diagram in block form of an automatic standardization system for use with the circuits of FIGS. 2 and 4 according to the invention.

Referring now to FIG. 5, a system for automatically sampling each of the channels in sequence and setting the gain control memory flip-flops is illustrated. This system includes a comparator 60 which has one input connected to a variable reference voltage 61 and the other input connected to receive the output of the full OR circuit 17 seen in FIG. 1. The output of the full OR device is sampled at a line 62 by a sample and hold circuit 63 having an output 64 going to the comparator 60. The voltage on the line 62 will be in the form of pulses occurring each time the flaw passes under one of the transducers since the transducer will be rotating with respect to the pipe. The circuit 63 functions to produce an output voltage on the line 64 equal to the peak value of the flaw pulse, this voltage being stored for a very short time. This voltage does change as the magnitude of the flaw pulses change. The other input to the comparator 60 may be a potentiometer connected across a reference potential to provide the variable reference voltage 61. The comparator 60 produces a positive output voltage so long as the reference voltage 61 is greater than the voltage at input 64, but when the input 64 exceeds the reference voltage a negative going pulse or voltage appears as the output 65 from the comparator switches to a low or negative voltage. The output of the comparator is used to control a sensitivity register and an address register which will now be explained.

In FIG. 5, a sensitivity register 70 is illustrated which is employed for setting the memory flip-flops 44, FIG. 4, in each of the channels in sequence. The sensitivity register comprises two sets of four bistable or flip-flop circuits 71 having outputs 72 which are connected by the input lines 49 to the flip-flops 44 in the eight or twenty of the circuits of FIG. 4. It is noted that the outputs 72 are in fact bus lines connected in common to all of the channels at the same time. However, since only one channel at a time is enabled, then only that particular channel will be responsive to the outputs on the lines 49 or 72. The flip-flop circuits 71 making up the sensitivity register as shown are connected to count sequentially in a binary-coded-decimal fashion, the first four flip-flops corresponding to the one, two, four and eight bits for the units digit, while the second four stages correspond to the ten, twenty, forty and eighty bits in the tens digit. Actually these flip-flops would interconnect in a manner different from that illustrated since each set of four inherently counts to sixteen rather than ten, but this is a conventional technique. For each pulse applied to an input 73, the sensitivity register 70 will step up one decimal unit, while the decimal number registered in the series of flip-flops 71 at any one time is represented in a binary-coded-decimal fashion on the lines 49. Pulses are applied to the input 73 from a clock pulse generator 74 having an output line 75 so long as an AND gate 76 is enabled by a voltage appearing on the output 65 from the comparator. Thus, so long as the sampled voltage is less than the reference voltage 61, clock pulses will pass through the AND gate 76 and drive the register 70. The repetition rate of the clock pulses produced by the generator 74 need not be any faster than the rate of revolution of the transducer with respect to the pipe, since there would be no need for adding an increment to the sensitivity register if the detected voltage could not have changed. For the addressed channel, its sensitivity changes each time the sensitivity register is incremented; thus the executed voltage is present for each increment. As soon as the flaw pulses or the voltage applied to the input 64 to comparator 60 reaches the desired or reference voltage, the voltage on the line 65 at the comparator output will drop and the AND gate 76 will be closed so no more clock pulses will appear on the input 73. At this point an execute signal, as continuously occurs in this situation, causes the number represented in the register 70 to be read into the flip-flops 44 in one of the channels. The sensitivity register 70 is reset upon the occurrence of the negative-going voltage on the line 65 which is applied to an input 77 to a delay device 78 and thus to a line 79 going to inputs to all of the flip-flop circuits 71. When the flaw signal level has reached the desired value so that the comparator output switches, the memory flip-flops 44 for this particular channel will remain in the condition which produces this level, and after a short delay introduced by the device 78, all of the flip-flops 71 in the sensitivity register will be reset to the zero condition. Flip-flops 71 are not reset until the next channel has been addressed so that the settings of the flip-flops of the channel just calibrated will not be disturbed.

The channels may be addressed selectively by the system of FIG. 5 from an address register 80 which consists of a plurality of numerical register stages 81 in the form of bistable or flip-flop circuits. There may be one stage 81 for each channel, or the flip-flop circuits 81 may be arranged in a binary or binary-coded-decimal sequence, and a decoder circuit used for producing an output to individually actuate only one of the channels at any one time. The stages 81 include outputs 82 connected separately to the address inputs 57 for each of the channels.

Only one of the outputs 82 will have a positive voltage thereon at one time, the remaining ones of the outputs 82 being zero. An input 83 to the address register is responsive to the negative-going portion of the output 65 from the comparator 60. Thus, when the output level reaches the reference for a given channel, and the comparator output switches, the address register will be pulsed once and will shift to the next stage, therefore addressing the next channel. The address line for this next channel will remain actuated until its sensitivity has been brought up to the proper level so that the comparator output will again switch. The address register 80 is reset to zero by inputs to each of the stages from a reset line 84. This reset line may be excited from an output from the last counter stage in the address register which would be switched after the last channel had been brought up to the desired sensitivity, or of course the reset line might be manually energized. In any event, the address register 80 is reset after the sensitivity of all of the channels has been properly adjusted.

Figure 6:
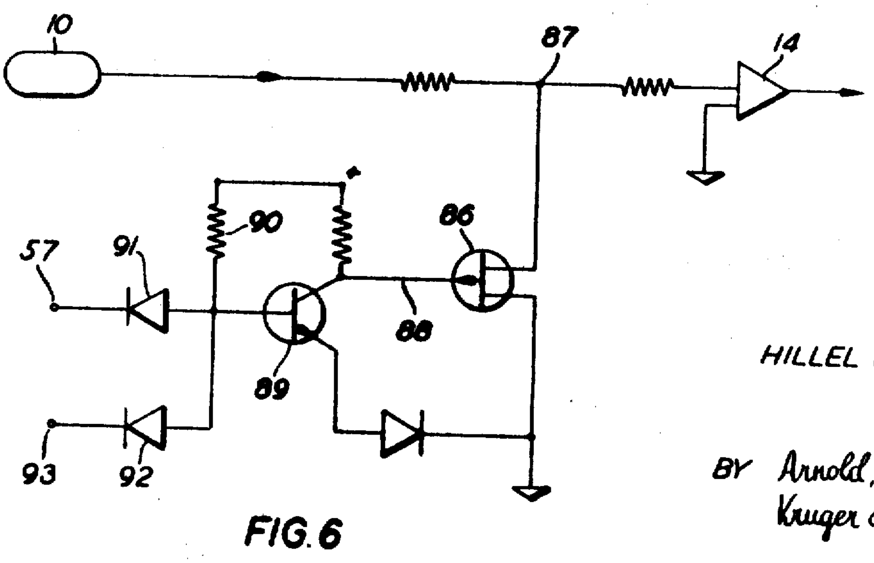
FIG. 6 is an electrical diagram in schematic form of a channel selector arrangement for use in the calibration system of the invention.

Referring now to FIG. 6, a circuit for selecting only one of the channels for a sensitivity adjust is illustrated. While sampling and comparing the output of the full OR circuit 17 as discussed with reference to FIG. 5, it is necessary that only one of the channels be operating, and so a field effect transistor 86 is used in the input to the amplifier 14 in each channel in order to either short the channel to ground or present a very high impedance to ground so that the channel will function. The source and drain electrodes of the field effect transistor 86 are connected between a point 87 and ground or a referentce potential. The point 87 may be the juncture between a pair of series input resistors for the operational amplifier 14. The transducer 10 is of course connected to this input, perhaps through a preamplifier. When a positive voltage is applied to a gate 88 for this field effect transistor, a very high impedance will appear between its source and drain electrodes, whereas when a low voltage is applied between the gate 88 and the reference potential or ground, as when a transistor 9 conducts, the point 87 will be shunted to ground and this particular channel will be rendered inoperative. For a channel having its field effect transistor in the shunted condition, of course, any signal in that channel will be shunted to ground and will not couple to OR circuit 17. The transistor 89 will be conductive at all times due to a resistor 90 connected between its base and the positive supply, except for the effect of an OR gate arrangement including a pair of diodes 91 and 92. The input to one of the diodes consists of the individual address lines 57, i.e., the outputs 82 from the stages in the address register. Another input 93 to the OR gate through diode 92 is a general address line which is common to all of the channels. For any given channel, when either the line 57 or the line 93 in FIG. 6 is negative or at a low voltage, the corresponding one of the diodes 91 and 92 will conduct, and a voltage drop across the resistor 90 will cause the transistor 89 to turn off; with the transistor 89 turned off, the gate voltage for the transistor 86 will be high, producing pinch-off for this field effect transistor and causing a high impedance to appear between the point 87 and ground so that this channel will be operative. During the sensitivity adjust cycle, a positive voltage is applied at all times to the input 93 to all of the circuits of FIG. 6 for all of the channels, and so only the addressed channel will be operative. A low or negative voltage, however, is applied to all of the inputs 57 from all of the stages in the address register 80 except one. For this one channel which is being addressed, a negative voltage will appear at the input 57 so that the transistor 89 will be turned off and the field effect transistor 86 will present a high impedance to the point 87, permitting this channel to be operative. Thus, all of the outputs 82 from the stages of the address register will be positive except one which will be negative, this being the channel which will be addressed. Alternatively, of course, inverters may be placed in the input of each OR gate; then the polarities would be reversed.

Figure 8:
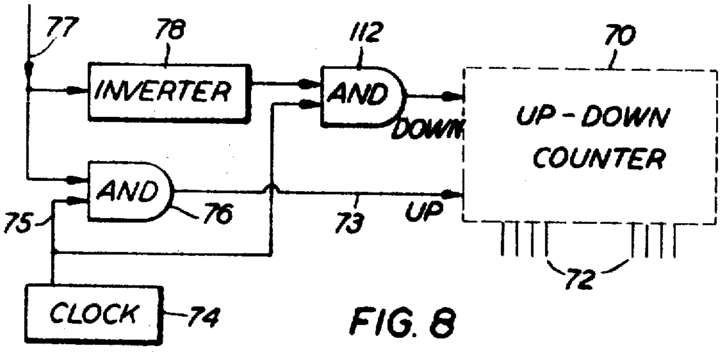
FIG. 8 is an illustration of an up-down counter which may be used in the sensitivity register of FIG. 5.

The sensitivity register 70 illustrated in FIG. 5 will be reset to zero before each cycle, and so when the sensitivity of each channel is adjusted it will start with a gain of zero. Of course, the desired gain will be at some value between one and ninety-nine, more likely about mid-range. Thus, as an alternative, a so-called "up-down" counter may be used in place of the simple register of FIG. 5. The up-down counter, see FIG. 8, as illustrated in FIG. 8, would remain at the level of the last channel rather than being reset to zero, and would count up or down from this point to the desired sensitivity level rather than starting at zero. This would save quite some time when it is recognized that the counter can be incremented no faster than once per revolution, and if the testing system is rotating at perhaps two hundred r.p.m., then up to perhaps one-half minute or more would be needed to adjust the sensitivity of each channel. If the sensitivity of the first channel is adjusted to a level of perhaps fifty-six, it is likely that the second and subsequent channels will be much closer to this level of fifty-six than zero and likely will be within a few percentage points of this level. Accordingly, while the system has been explained with reference to a more simple arrangement, it is understood that preferably a counter of the up-down type would be used to save time in making the calibration run. As seen in FIG. 8, the delay circuit 78 will be replaced with an inverter 78' feeding one input to a dual input and gate 112, the other input being from the clock.

Figure 7:
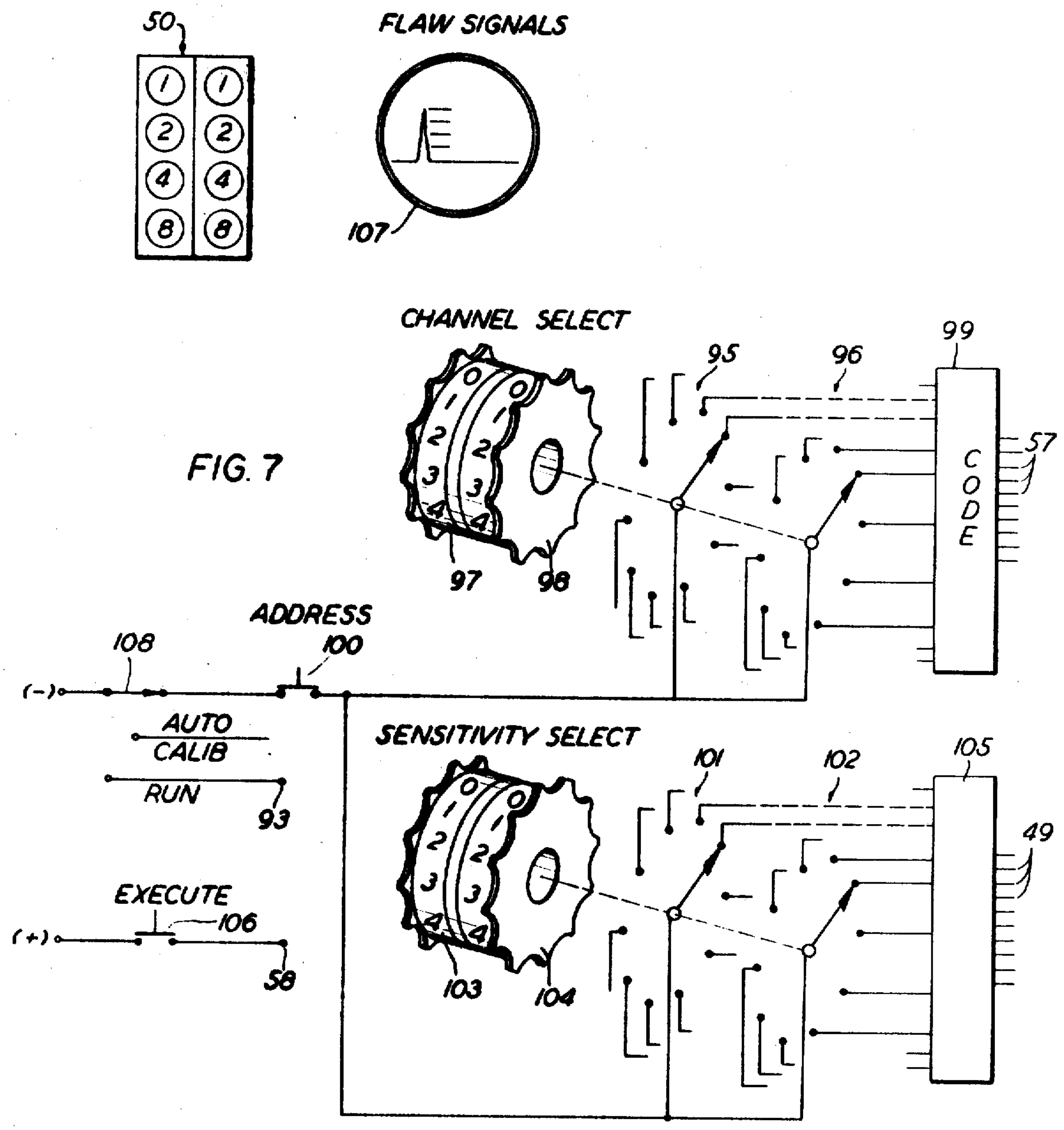
FIG. 7 is a schematic representation of a control arrangement and manual calibration system for use with the automatic arrangement of the invention.

Referring to FIG. 7, a manual control arrangement which may be used with the system thus far described is illustrated. To provide the function of the address register 80, a first set of rotary switches 95 and 96 is utilized, these being operated individually by a pair of thumb-wheel rotary indicator devices 97 and 98 of conventional form. The moving contacts of the switches 95 and 96 are individually rotated to selected positions by the thumb-wheel devices 97 and 98 so that particular ones of the contacts are energized, all of the contacts being connected to a decode arrangement 99 which converts the decimal information produced by the rotary switches to a unitary or exclusive code arrangement used to actuate one and only one of the address lines 57. Thus the output lines from the code arrangement 99 are exactly like the outputs 82 from the stages of the address register 80. One of the outputs 57 to the channels is not actually energized until an "address" switch 100 is depressed, whereupon the supply potential is applied to the rotary switches. Similarly, a pair of rotary switches 101 and 102 driven by thumb-wheel devices 103 and 104 provide the function of the sensitivity register 70. A code converter 105 consisting of appropriate diodes and connections converts the decimal digital information from the switches to binary-coded-decimal for functioning as the lines 49 going to the flip-flops 44 in FIG. 4. The rotary switches 101 and 102 are likewise not energized until the address switch 100 is depressed. Thus, the channel to be adjusted is selected by the thumb-wheel switches 97, 98; then the address switch 100 is depressed, at which time the channel which is addressed would have an enabling voltage applied to its address line 57 so that (1) the FET in the input of the amplifier 14 for this channel would present a high impedance due to the action of the circuit of FIG. 6 while the remaining FET's for the other channels would shunt the inputs of the amplifier 14 to ground, and (2) the gates 51 would be enabled so that the condition of the memory flip-flops 44 for this channel would be read out onto the indicator devices 50 which are also seen in FIG. 7 as binary-coded-decimal lamp indicators. Thus for the selected channel the sensitivity at which it is initially set would appear on the lamps 50. Next the thumb-wheel switches 103–104 would be rotated to the desired sensitivity, while observing the actual pulse output for this channel on a suitably calibrated meter or oscilloscope face 107. The sensitivity for this channel would not actually change until an execute button 106 is depressed, whereupon an enabling voltage is applied to the input 58 for all of the other channels at the same time. But since only one of these has an address voltage applied to its input 57 and thus to its input 56 to the gate 55, then the flip-flops 44 in only the address channel are permitted to change states. After the execute button 106 is depressed, the new selected value for the sensitivity as dialed on the thumb-wheel switches 103–104 will be entered into the memory flip-flops, and the flaw pulse magnitude for this value of sensitivity may be observed. Instead of the oscilloscope readout 107 illustrated in FIG. 7, a digital voltmeter readout may be used. This manual calibrate procedure is merely illustrated as an alternative, it being of course understood that the automatic calibration system described above is preferred. In FIG. 7 a switch 108 is illustrated for selecting between manual calibration, automatic calibration wherein the system of FIG. 5 is actuated, and the run condition wherein the general address line 93 as seen in FIG. 6 is actuated to render all channels operative.

In operation of the system thus far described in the automatic calibration mode, it may be noted that when the switch 108 is in the automatic position, and the execute 106 is depressed, the execute voltage will remain on the line 58 going to the memory flip-flops in all channels. The switch 108 in the "automatic calibration" position would latch the switch 106 so that the execute condition would sustain until the switch 108 is rotated to the "run" position. For the particular channel that is addressed by the output of the address register 80, the number appearing in the sensitivity register will then be always read into the flip-flops 44 so that the channel will always have the particular sensitivity dictated by the number in the sensitivity register.

It will be seen that the automatic calibration system which has been described will cycle through the entire series of channels and set each one so that its gain will produce a particular signal level as selected, no manual adjustments or evaluations being necessary, and no time-consuming steps such as turning a knob on a potentiometer or the like being needed. The field operator merely turns a switch and presses a button—then waits for a few minutes while the system cycles through all channels and calibrates or standardizes each one.

The system has been described with reference to an inspection system for pipe as would be used for well casings or gas or oil transmission lines. However, this automatic calibration or standardization system may be used in any non-destructive testing arrangement wherein a large number of channels, or indeed a single channel must be calibrated. In like manner, the system may be utilized in any multiple channel information system of the telemetry type used for data transmission or in a multiplex communication system. It may also be noted that while the system has been described with reference to binary-coded-decimal registers and the like, other coding arrangements may be used as appropriate for a particular desgn.

Accordingly, while the invention has been described with reference to particular embodiments, this description is not meant to be construed in a limiting sense. Various modifications of the disclosed embodiments, as well as other embodiments of the invention, may be apparent to persons skilled in the art upon reference to this description. It is therefore contemplated that the appended claims will cover any such modifications or embodiments as fall within the true scope of the invention.

1. Inspection apparatus including a plurality of defect detectors that produce an electrical signal upon detecting a defect in an article being inspected, a plurality of signal channels coupled to the respective defect detectors and to means for indicating the detection of a defect, means for causing said detectors to continuously scan a known defect to produce repetitive defeat signals in each of said channels, sensitivity adjustment means in each of said signal channels for incrementally adjusting the sensitivity of the respective channels, a plurality of signal storage means each coupled to the sensitivity adjustment means of a respective channel for storing a coded signal comprised of a plurality of bits that controls the adjustment of the sensitivity adjustment means, means for sequentially sampling said signal channels one at a time to obtain samples of the defect signals in the sampled channel, means providing a reference signal that is representative of the desired magnitude of a sampled defect signal, comparator means for comparing the magnitudes of the reference signal and sampled defect signals from a sampled channel and for providing first and second error signals when the reference signal is, respectively, greater than a sampled defect signal, a sensitivity register coupled to the output of said comparator means, said sensitivity register comprising counting means that provides an output representing said coded signal and each input of a first error signal to the sensitivity register producing an incremental change in said coded signal, an address register coupled to the output of said comparator means and operative to change the connection of the sensitivity register to a different one of said storage means when the magnitude of the sampled defect signals of a sampled channel are substantially equal to said reference signal, and means operable upon command for initiating the sequential sampling and sensitivity adjustment of said plurality of signal channels.

2. Apparatus as claimed in claim 1 wherein:

said sensitivity register is an up-down counter operable to count up upon receipt of a first error signal from the comparator means and to count down upon receipt of a second error signal from said comparator means, said up-down counter operating to retain the count registered therein when it is sequentially connected to different ones of said storage means by the address register.

3. Apparatus as claimed in claim 1 wherein:

said sensitivity register is a counting means that counts in one direction only in response to said first error signals from the comparator means, said apparatus further including:

delay means operable in response to said second error signals to reset said counting means to a beginning count only after it has been connected to a different storage means by the address register, whereby the storage means last connected to the counting means will retain the coded signal present in the counting means at the last occurrence of the second error signal.

4. Inspection apparatus including a plurality of defect detectors that produce an electrical signal upon detecting a defect in an article being inspected, a plurality of signal channels coupled to the respective defect detectors and to means for indicating the detection of a defect, means for causing said detectors to continuously scan a known defect to produce repetitive defect signals in each of said channels, sensitivity adjustment means in each of said signal channels for incrementally adjusting the sensitivity of the respective channels, a plurality of signal storage means each coupled to the sensitivity adjustment means of a respective channel for storing a coded signal compirsed of a plurality of bits that controls the adjustment of the sensitivity adjustment means, means for sequentially sampling said signal channels one at a time to obtain samples of the defect signals in the sampled channel, means providing a reference signal that is representative of the desired magnitude of a sampled defect signal, comparator means for comparing the magnitudes of the reference signal and sampled defect signals from a sampled channel and for providing first and second error signals when the reference signal is, respectively, greater than and less than a sampled defect signal, a sensitivity register coupled to the output of said comparator means, said sensitvity register providing an output representing said coded signals, and each input of a first error signal to the sensitivity register producing an incremental change in said coded signal, an address register coupled to the output of said comparator means and operative upon receipt of a second error signal to change the connection of the sensitivity register to a different one of said storage means, and means operable upon command for initiating the sequential sampling and sensitivity adjustment of said plurality of signal channels.

5. The apparatus claimed in claim 4 and including: means operable upon receipt of a second error signal from said comparator means for resetting said sensitivity register to a beginning count after the sensitivity register has been connected in sequence to the next one of said storage means by said address register.

References Cited

UNITED STATES PATENTS

| | | | |
|---|---|---|---|
| 2,626,322 | 1/1953 | Appleman | 330—2X |
| 3,012,197 | 12/1961 | Peterson et al. | 330—2X |
| 3,132,308 | 5/1964 | Munson et al. | 330—144 |
| 3,333,247 | 7/1967 | Hadley et al. | 340—172.5 |
| 3,345,608 | 10/1967 | Brown et al. | 340—172.5 |
| 3,374,470 | 3/1968 | Rohland | 340—172.5 |
| 3,392,370 | 7/1968 | Neitzel | 340—144X |
| 3,434,065 | 3/1969 | Chu et al. | 330—2 |

PAUL J. HENON, Primary Examiner

H. E. SPRINGBORN, Assistant Examiner